(12) United States Patent
Wikaryasz et al.

(10) Patent No.: US 9,140,174 B2
(45) Date of Patent: Sep. 22, 2015

(54) EXHAUST TREATMENT DEVICE WITH INTEGRAL MOUNT

(71) Applicant: Tenneco Automotive Operating Company Inc., Lake Forest, IL (US)

(72) Inventors: Megan Wikaryasz, Ypsilanti, MI (US); Douglas Otrompke, Ypsilanti, MI (US); Pavel Robles, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 14/619,613

(22) Filed: Feb. 11, 2015

(65) Prior Publication Data

US 2015/0152772 A1 Jun. 4, 2015

Related U.S. Application Data

(63) Continuation of application No. 14/274,818, filed on May 12, 2014, which is a continuation-in-part of application No. 13/268,124, filed on Oct. 7, 2011, now Pat. No. 8,721,977.

(51) Int. Cl.
| | |
|---|---|
| *B01D 50/00* | (2006.01) |
| *F01N 13/14* | (2010.01) |
| *B01D 53/94* | (2006.01) |
| *F01N 13/18* | (2010.01) |
| *F01N 3/28* | (2006.01) |
| *F01N 13/00* | (2010.01) |
| *B01D 46/00* | (2006.01) |
| *B01D 46/42* | (2006.01) |

(52) U.S. Cl.
CPC .............. *F01N 13/14* (2013.01); *B01D 46/001* (2013.01); *B01D 46/4218* (2013.01); *B01D 53/94* (2013.01); *F01N 3/28* (2013.01); *F01N 3/2853* (2013.01); *F01N 13/0097* (2014.06); *F01N 13/1805* (2013.01); *F01N 13/1822* (2013.01); *F01N 13/1872* (2013.01); *F01N 2470/18* (2013.01)

(58) Field of Classification Search
CPC .. F01N 13/141; F01N 13/148; F01N 2470/18
USPC .......................... 422/168, 176, 177, 180, 171
See application file for complete search history.

(56) References Cited

U.S. PATENT DOCUMENTS

| | | | |
|---|---|---|---|
| 3,771,969 A | * | 11/1973 | Scheitlin ...................... 422/171 |
| 4,615,500 A | | 10/1986 | Layson |
| 4,617,176 A | | 10/1986 | Merry |
| 4,643,458 A | | 2/1987 | Ammar |

(Continued)

FOREIGN PATENT DOCUMENTS

JP 8-144740 6/1996

*Primary Examiner* — Tom P Duong
(74) *Attorney, Agent, or Firm* — Harness, Dickey & Pierce, P.L.C.

(57) ABSTRACT

An exhaust treatment device includes an inner shell spaced apart from an outer shell by a first gap. An inlet assembly includes a first inner cap and a first outer cap spaced apart by a second gap. An outlet assembly includes a second inner cap and a second outer cap spaced apart from each other by a third gap. A substrate is located within the inner shell. An insulating mat is positioned between the substrate and the inner shell and includes a reduced diameter portion compressing the insulating mat between the inner shall and the substrate. Insulation material fills the first, second and third gaps that are in communication with each other.

3 Claims, 9 Drawing Sheets

(56) References Cited

U.S. PATENT DOCUMENTS

| | | |
|---|---|---|
| 4,865,818 A | 9/1989 | Merry et al. |
| 5,008,086 A | 4/1991 | Merry |
| 5,073,353 A | 12/1991 | Florian |
| 6,247,304 B1 | 6/2001 | Kim et al. |
| 6,319,444 B1 * | 11/2001 | Kirk .............. 264/136 |
| 6,667,013 B1 | 12/2003 | Nilsson |
| 6,824,744 B1 * | 11/2004 | Stoepler et al. .............. 422/179 |
| 7,241,329 B2 | 7/2007 | Weber |
| 7,517,380 B2 | 4/2009 | Grimm et al. |
| 7,611,561 B2 | 11/2009 | Hill, Jr. et al. |
| 7,765,801 B2 | 8/2010 | Hill, Jr. et al. |
| 7,774,936 B2 | 8/2010 | Kroner et al. |
| 7,854,904 B2 | 12/2010 | Merry |
| 7,966,979 B2 | 6/2011 | Olsen et al. |
| 8,281,581 B2 | 10/2012 | Oliver et al. |
| 2004/0009105 A1 | 1/2004 | Watanabe et al. |
| 2004/0109795 A1 | 6/2004 | Marc |
| 2006/0067860 A1 * | 3/2006 | Faircloth et al. .............. 422/171 |
| 2006/0277900 A1 | 12/2006 | Hovda et al. |
| 2007/0151231 A1 | 7/2007 | Rinaldi |
| 2009/0232592 A1 | 9/2009 | Gudorf et al. |
| 2010/0031644 A1 | 2/2010 | Keane et al. |
| 2010/0095660 A1 | 4/2010 | Oliver et al. |
| 2010/0186382 A1 | 7/2010 | Schroeder et al. |
| 2010/0186394 A1 | 7/2010 | Harrison et al. |
| 2010/0187383 A1 | 7/2010 | Olsen et al. |
| 2010/0307001 A1 | 12/2010 | Hill, Jr. et al. |
| 2011/0023471 A1 | 2/2011 | Werni et al. |
| 2011/0047963 A1 | 3/2011 | Kasaoka et al. |
| 2011/0146248 A1 | 6/2011 | Charles et al. |
| 2011/0203692 A1 * | 8/2011 | Werni et al. .................... 138/37 |
| 2012/0124968 A1 | 5/2012 | Tamamidis |
| 2012/0134889 A1 * | 5/2012 | Freis et al. .................... 422/168 |

* cited by examiner

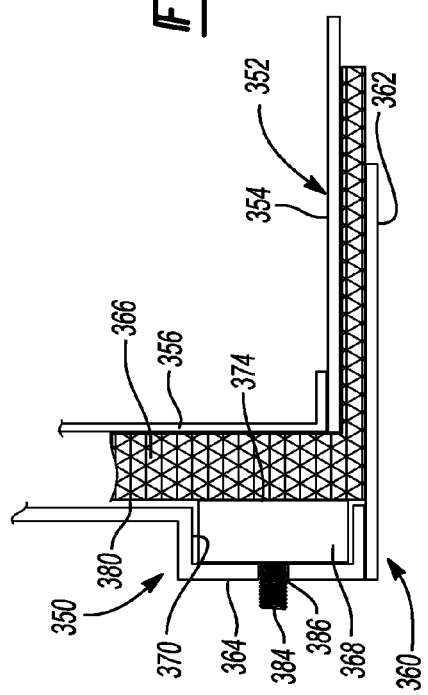
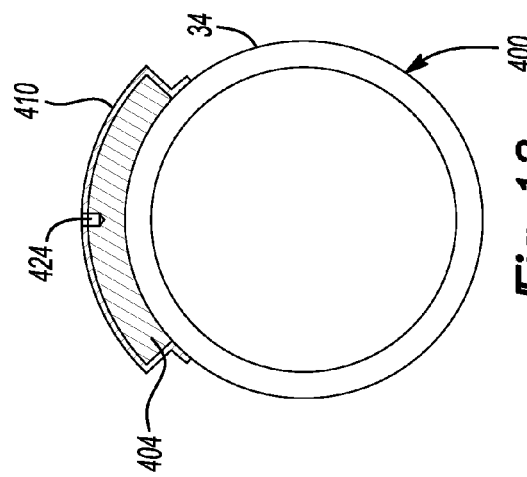
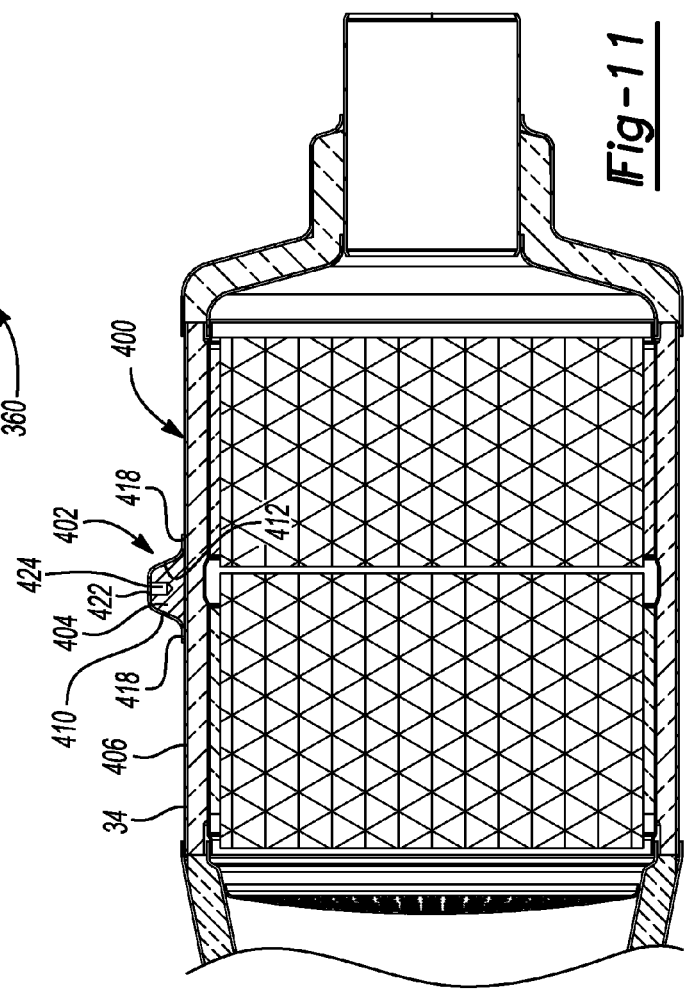

EXHAUST TREATMENT DEVICE WITH INTEGRAL MOUNT

CROSS-REFERENCE TO RELATED APPLICATIONS

This application is a continuation of U.S. patent application Ser. No. 14/274,818 filed on May 12, 2014, which is a continuation-in-part of U.S. patent application Ser. No. 13/268,124, filed Oct. 7, 2011 (now U.S. Pat. No. 8,721,977, issued May 13, 2014). The entire disclosure of each of the above applications is incorporated herein by reference.

FIELD

The present disclosure relates to an exhaust treatment device for reducing undesirable emissions from an internal combustion engine and, in particular, to a robust, integrated mounting system for supporting the exhaust treatment device on a vehicle.

BACKGROUND

This section provides background information related to the present disclosure which is not necessarily prior art.

Exhaust gas treatment devices such as catalytic converters, diesel oxidation catalysts, diesel particulate filters, and the like, may be employed in various applications to treat exhaust gasses emitted from internal combustion engines. Many of the exhaust gas treatment devices include relatively heavy components such as a ceramic substrate or a catalyst bed for treating the exhaust. The system for coupling the exhaust treatment device to the vehicle must withstand a wide range of external inputs such as when a vehicle wheel enters and exits a pothole in the road.

Typical exhaust treatment devices are fixed to the vehicle underbody or frame with a number of welded brackets or straps. While these arrangements may have sufficiently supported the exhaust treatment device in the past, the cost and complexity of individually welding support brackets to the exhaust treatment device is undesirable. Depending on the number of brackets used and their location, stress concentrations may be introduced that may negatively affect the useful life of the exhaust treatment device. In addition, the use of clamps may introduce additional challenges in mounting to assure the proper orientation of the exhaust treatment device and the clamp in order to clear other vehicular components.

One known exhaust treatment device includes an inlet end formed as a casting that is subsequently coupled to a sheet metal housing. The casting includes a mounting provision for the exhaust treatment device. Unfortunately, as the entire inlet assembly is formed from a cast component, heat is transferred readily from the interior of the exhaust treatment device to an exterior surface of the cast inlet assembly. Most end users and Original Equipment Manufacturers prefer an insulated arrangement where the external temperature of the treatment device remains below a predetermined maximum temperature. Furthermore, the casting is relatively large, heavy and costly. Accordingly, it may be beneficial to provide an improved exhaust treatment device including a cost effective integral mounting system having sufficient thermal shielding.

SUMMARY

This section provides a general summary of the disclosure, and is not a comprehensive disclosure of its full scope or all of its features.

An exhaust treatment device includes an inlet tube having an end in communication with a cavity within a housing. A substrate for treating engine exhaust is positioned within the housing. A metal mounting member includes a mounting provision. A retaining plate is engaged with the metal mounting member and fixed to the housing to retain the mounting member between the housing and the retaining plate.

An exhaust treatment device includes an insulation material positioned between an inner shell and an outer shell. An inlet tube has an end in communication with a cavity defined by the inner shell. A substrate for treating engine exhaust is positioned within the inner shell. A metal mounting ring is positioned between the inner and outer shells and includes a mounting provision for receipt of a fastener.

An exhaust treatment device includes an inner shell, an outer shell and an insulation material positioned therebetween. An inlet tube includes an end in communication with a cavity defined by the inner shell. A substrate for treating engine exhaust is positioned within the inner shell. A metal mounting member includes a mounting provision. A cover plate engages the mounting member and is fixed to the outer shell to retain the mounting member between the outer shell and the cover plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a fragmentary cross-sectional of another exhaust treatment device;

FIG. 11 is a fragmentary cross-sectional of another exhaust treatment device; and FIG. 12 is a fragmentary cross-sectional of the exhaust treatment device depicted in FIG. 11.

Corresponding reference numerals indicate corresponding parts throughout the several views of the drawings.

DETAILED DESCRIPTION

Figure 1:
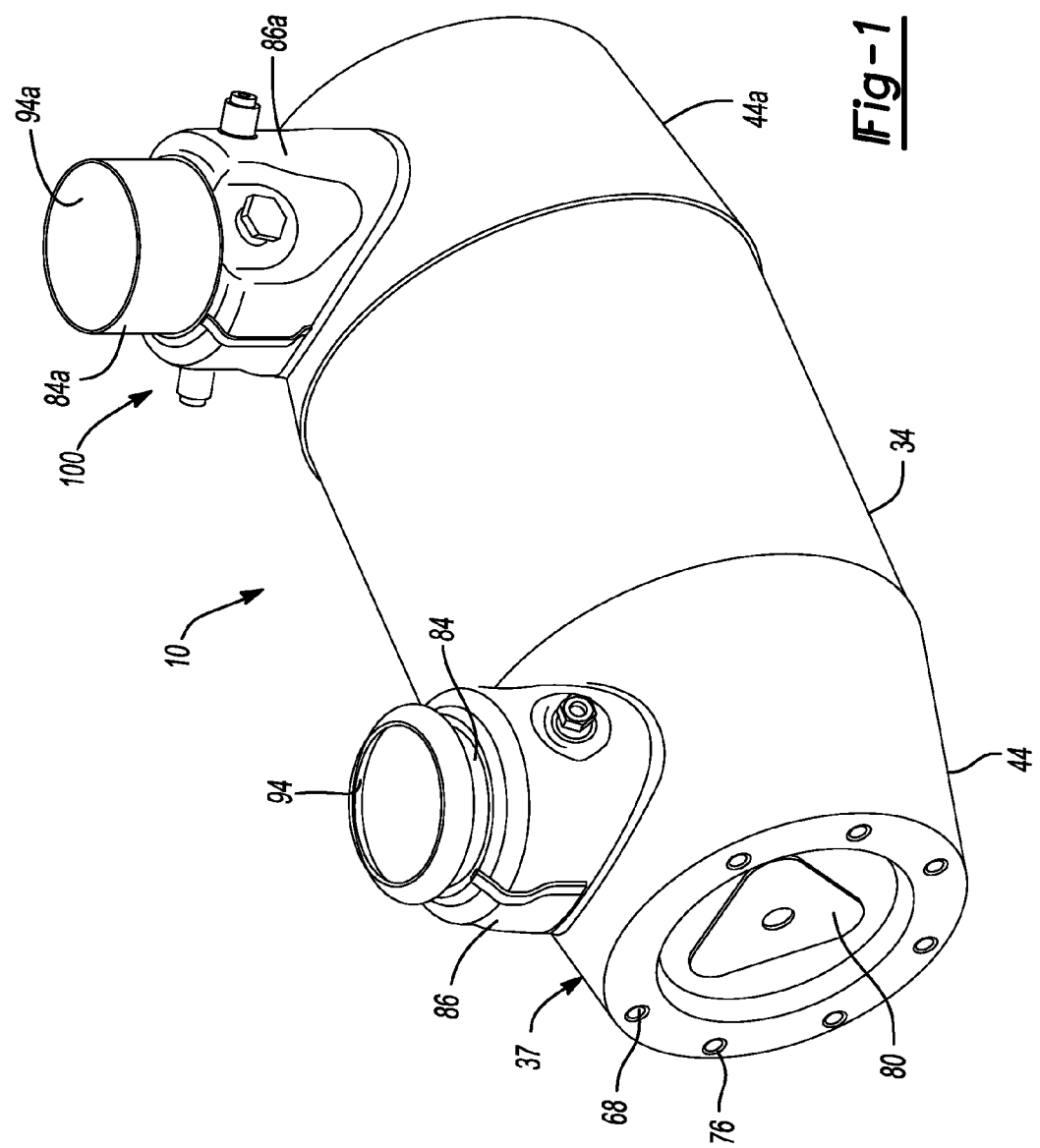
FIG. 1 is a perspective view of an exemplary exhaust treatment device with an integral mount.
Figure 2:
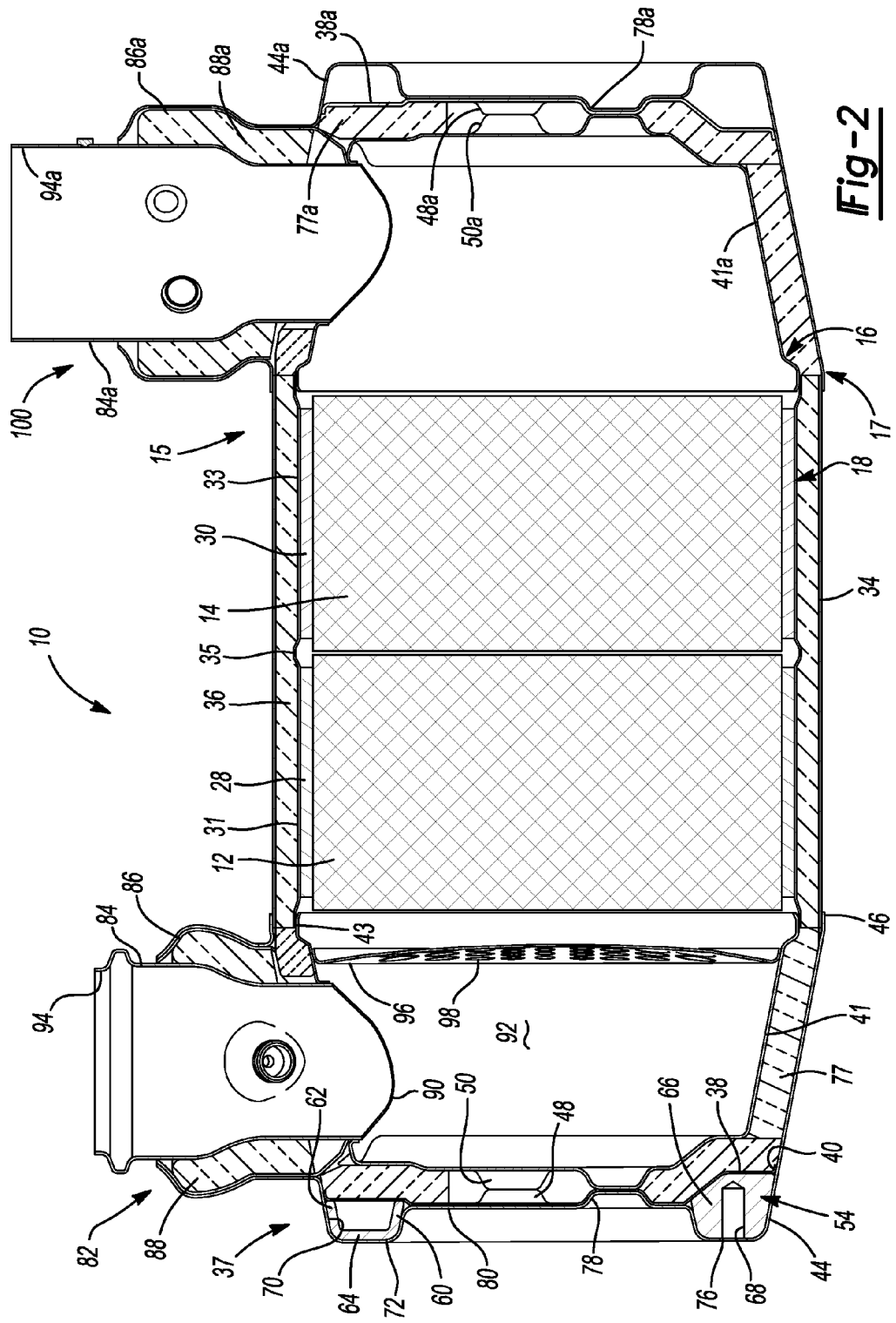
FIG. 2 is a cross-sectional view taken through the exhaust treatment device depicted in FIG. 1.
Figure 3:
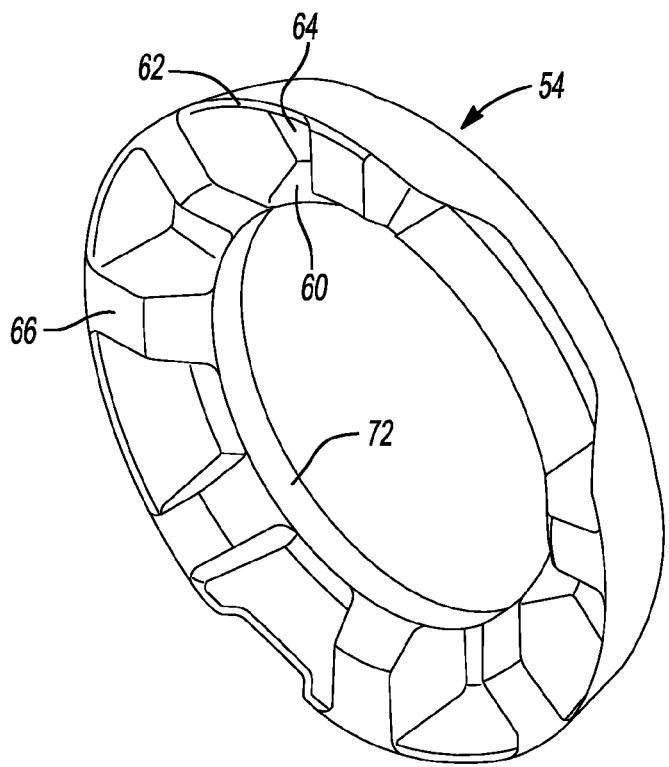
FIG. 3 is a perspective view of a cast mounting ring.
Figure 4:
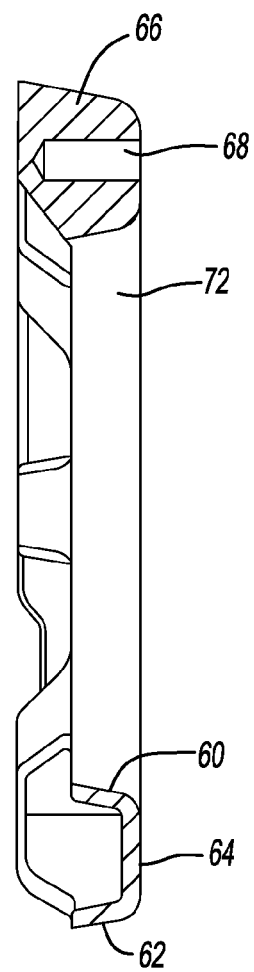
FIG. 4 is a cross-sectional view taken through the cast mounting ring depicted in FIG. 3.

Example embodiments will now be described more fully with reference to the accompanying drawings.

FIGS. 1-4 depict an exemplary exhaust treatment device identified at reference numeral 10. Exhaust treatment device 10 includes a first substrate 12 positioned upstream of a second substrate 14 within a housing 15. First substrate 12 may be a diesel oxidation catalyst or a selective catalytic reduction device, while second substrate 14 may be a diesel particulate filter or a slip catalyst. Other exhaust treatment elements may be used in lieu of first substrate 12 and second substrate 14. Furthermore, the present disclosure relates to an exhaust treatment device that includes one or more substrates within housing 15. The two substrate arrangements depicted in the Figures is merely for illustration purposes.

Housing 15 includes an inner shell 16 and an outer shell 17 surrounding inner shell 16. Inner shell 16 includes several metal stampings coupled to one another. For example, inner shell 16 includes an inner tube 18 in receipt of first substrate 12 and second substrate 14. The substrates 12, 14 are retained within inner tube 18 using a stuffing or sizing process for compressing a first mat 28 between first substrate 12 and inner tube 18, as well as compressing a second mat 30 between second substrate 14 and inner tube 18. Inner tube 18 includes a first reduced diameter portion 31 engaging first mat 28 and compressing first mat 28 between first substrate 12 and the reduced diameter portion of the inner tube 18. Inner tube 18 also includes a second reduced diameter portion 33 engaging second mat 30 to compress second mat 30 between second substrate 14 and inner tube 18. An undeformed central portion 35 of the inner tube 18 is positioned between first reduced diameter portion 31 and second reduced diameter portion 33. Outer shell 17 also includes several interconnected stampings such as an outer tube 34 circumscribing inner tube 18. An insulation material 36 surrounds inner tube 18 and is positioned between outer tube 34 and inner tube 18.

An inlet assembly 37 is fixed to outer tube 34 and inner tube 18. Inlet assembly 37 includes a ring cover plate 38 having a flange 40 fixed to a first end cap 44. An inner inlet 41 includes a lip 43 fixed to inner tube 18. Inner inlet 41 forms a portion of inner shell 16 while end cap 44 forms a portion of outer shell 17.

A mounting ring 54 is positioned between first end cap 44 and ring cover plate 38. Mounting ring 54 may be cast from a ductile iron having a high content of silicon and molybdenum as a one-piece monolithic component. This material provides excellent structural physical properties and may withstand the high temperature environment of the exhaust treatment device. The mounting ring may alternatively be formed using processes such as forging, stamping, or machining. Metallic materials other than those listed are also contemplated.

Mounting ring 54 includes a generally cup-shaped hollow cross section defined by an inner wall 60 and an outer wall 62 interconnected by an end wall 64. A plurality of solid mounting bosses 66 are circumferentially spaced apart from one another. Each boss 66 includes a threaded aperture 68 for receipt of a fastener (not shown) to mount exhaust treatment device 10 to the vehicle. To define a robust structural mount for exhaust treatment device 10, an inner surface 70 of first end cap 44 is shaped as a pocket complementing an external surface 72 of mounting ring 54. A plurality of apertures 76 extend through first end cap 44 in alignment with threaded apertures 68. It should be appreciated that mounting ring 54 need not include the cup-shaped portions and may be shaped to have a more consistent solid cross-section.

To assemble exhaust treatment device 10, mounting ring 54 is placed into engagement with inner surface 70. Ring cover plate 38 is positioned to engage mounting ring 54. Flange 40 is welded to first end cap 44 to retain mounting ring 54 at a desired location and provide a structural interconnection between the casting and the remaining stamped steel components. First end cap 44 is also welded to mounting ring 54. An insulation material 77 is trapped between ring cover plate 38 and inner inlet 41.

Ring cover plate 38 includes at least one boss 48 engaging a like boss or plurality of bosses 50 formed on inner inlet 41. First end cap 44 also includes a boss or set of bosses 78 positioned in engagement with the boss or bosses 48 of ring cover plate 38. Each set of bosses are welded together to fix first end cap 44, ring cover plate 38 and inner inlet 41 to each other. Each weld joins three adjacent sheet steel portions. First end cap 44 includes a flange 46 that is fixed to outer tube 34 after the completion of inlet assembly 37. A thermal shield 80 may optionally be fixed to an exterior surface of first end cap 44 to cover bosses 78 because these areas are devoid of insulation 77.

An inlet pipe assembly 82 includes a pipe 84 fixed to a shield 86. An insulation material 88 is positioned between pipe 84 and shield 86. Pipe 84 includes a first end 90 extending through both outer tube 34 and inner tube 18 in communication with a cavity 92 formed upstream of first substrate 12. An inlet 94 is formed at the second opposite end of inlet pipe assembly 82 for receipt of exhaust from the internal combustion engine.

A flow distribution plate 96 is fixed to inner inlet 41 at a position downstream from first end 90 of pipe 84. Flow distribution plate 96 includes a plurality of spaced apart apertures 98 having different sizes to induce a substantially uniform exhaust gas flow through first substrate 12.

An outlet assembly 100 may be constructed using some of the same or at least very similar components used to manufacture inlet assembly 37. For example, outlet assembly 100 includes a second end cap 44a, a ring cover plate 38a, an insulation material 77a, an inner outlet 41a, a pipe 84a, a shield 86a, insulation 88a and an outlet 94a. Other features of outlet assembly 100 are substantially similar to the features of the components forming inlet assembly 37. As such, these elements will be identified with a lower "a" suffix.

The interconnection of components to form outer assembly 100 is substantially the same as inlet assembly 37 with the exception that mounting ring 54 is not present within outlet assembly 100 depicted in the Figures. It should be appreciated, however, that should mounting flexibility be required, outlet assembly 100 may include a mounting ring substantially similar to mounting ring 54. In yet another arrangement, inlet assembly 37 may be constructed without mounting ring 54 and outlet assembly 100 may include a mounting ring sandwiched between second end cap 44a and ring cover plate 38a.

Figure 5:
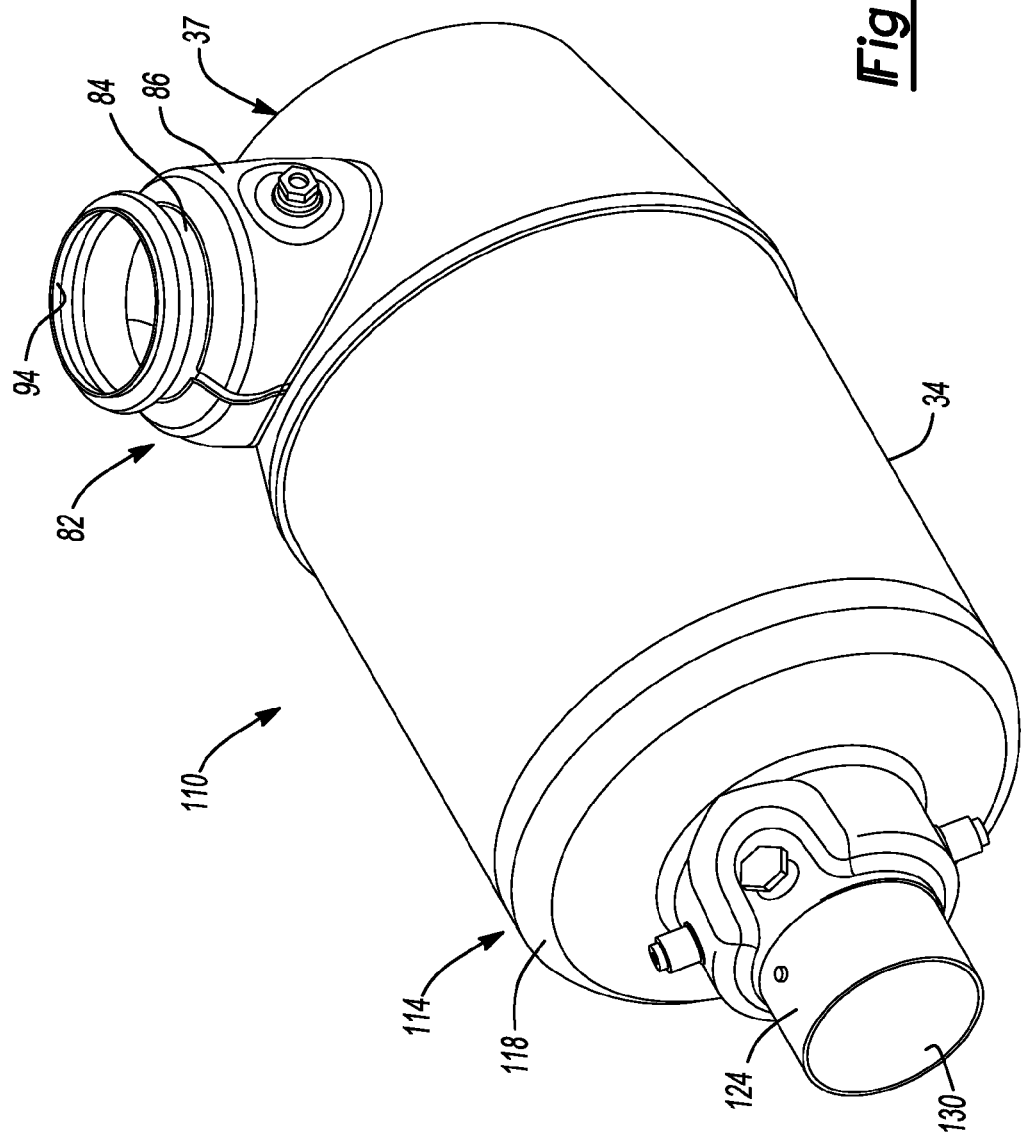
FIG. 5 is a perspective view of an alternate exhaust treatment device.
Figure 6:
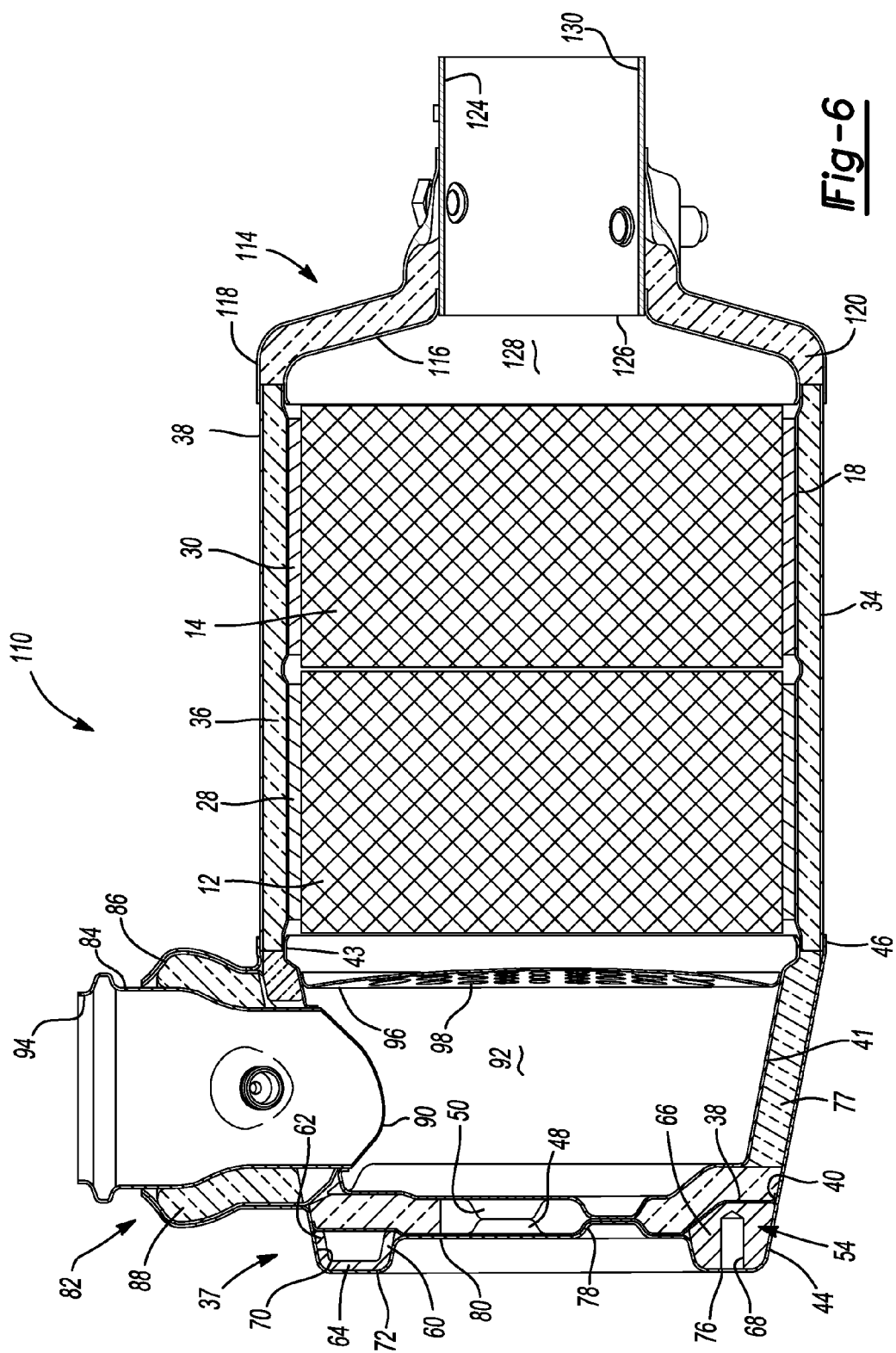
FIG. 6 is a cross-sectional view taken through the exhaust treatment device depicted in FIG. 5.

FIG. 5 depicts an alternate exhaust treatment device identified at reference numeral 110. Exhaust treatment device 110 is substantially the same as exhaust treatment device 10 with the exception that outlet assembly 100 has been replaced with an outlet assembly 114. Outlet assembly 114 includes an inner cone 116 fixed to inner tube 18 and an outer cone 118 fixed to outer tube 34. An insulation material 120 is positioned between inner cone 116 and outer cone 118. A tube 124 extends through apertures formed in both outer cone 118 and inner cone 116 to place a first end 126 of tube 124 in communication with a cavity 128. Tube 124 includes an outlet 130 to allow treated exhaust to escape exhaust treatment device 110.

Exhaust treatment device 110 provides an alternate plumbing arrangement from device 10. Pipe 84 transversely intersects an axis aligned with a direction of exhaust flow through substrates 12, 14. Tube 124 provides an outlet coaxially aligned with this flow axis. This contrasts with the plumbing arrangement defined by exhaust treatment device 10 where both the inlet 94 and the outlet 94a extend at right angles to a direction of exhaust flow through substrates 12, 14. One skilled in the art will appreciate that other geometrical arrangements of the inlet, outlet and exhaust flow path are contemplated as being within the scope of the present disclosure.

Figure 7:
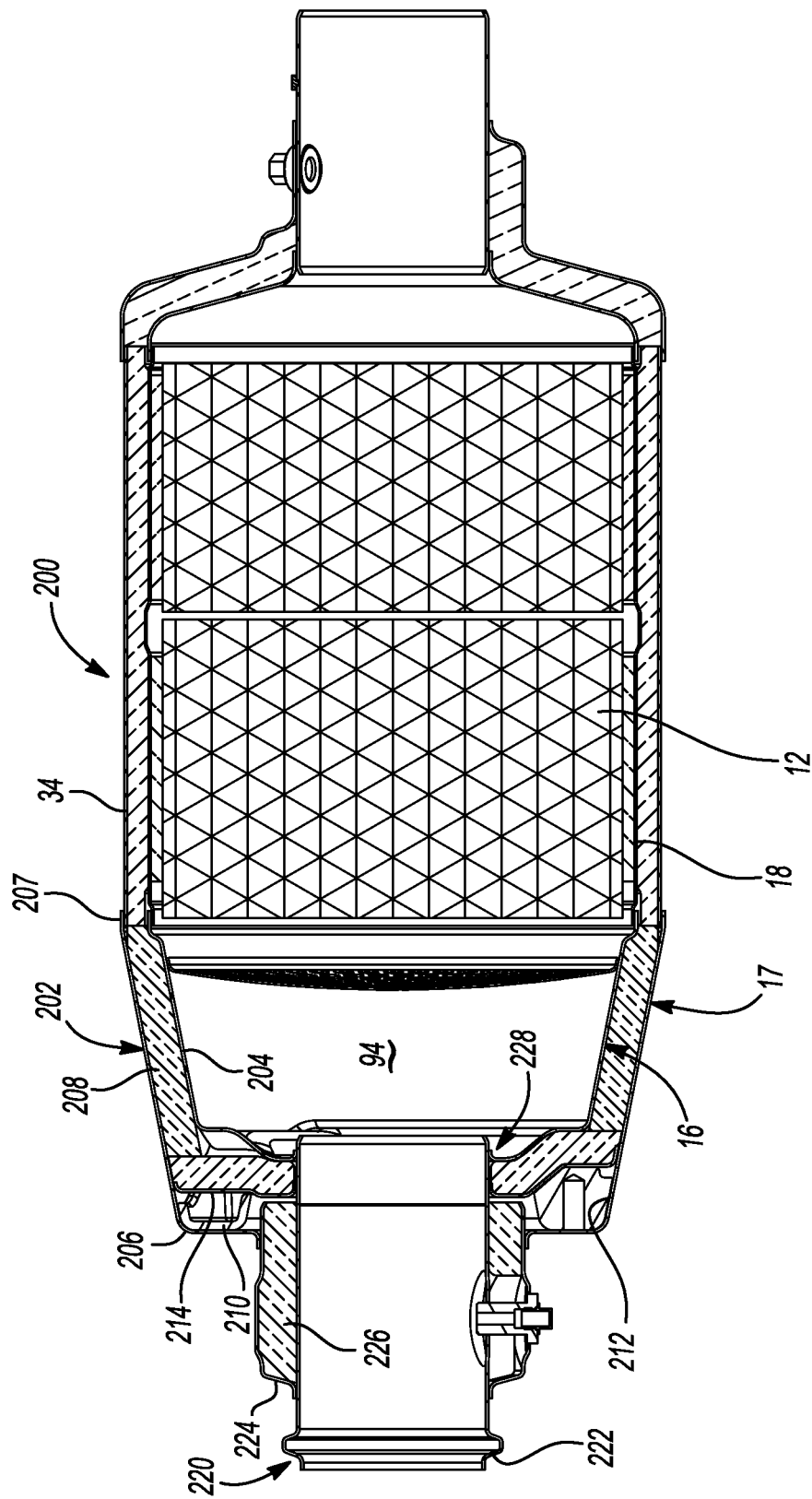
FIG. 7 is a cross-sectional view of an alternate exhaust treatment device.

FIG. 7 depicts an alternate exhaust treatment device identified at reference numeral 200. Exhaust treatment device 200 is substantially the same as exhaust treatment device 110 with the exception that inlet assembly 37 is replaced with an inlet assembly 202. Inlet assembly 202 includes an inner inlet 204 fixed to inner tube 18 to form a portion of inner shell 16. An end cap 206 is a cup-shaped stamping surrounding inner inlet 204 and includes an end 207 fixed to outer tube 34 to form a portion of outer shell 17. Insulation 208 is positioned between inner inlet 204 and end cap 206. A mounting member 210 is sandwiched between an inner surface 212 of end cap 206 and a retaining plate 214. Retaining plate 214 is fixed to end cap 206. An inlet pipe assembly 220 includes a pipe 222 fixed to a shield 224. An insulation material 226 is positioned between pipe 222 and shield 224. Pipe 222 includes a first end 228 extending through end cap 206, retaining plate 214, and inner inlet 204 to be in communication with cavity 94 upstream of first substrate 12. Shield 224, retaining plate 214 and inner inlet 204 are fixed to pipe 222. Pipe 222 extends through mounting member 210.

Figure 8:
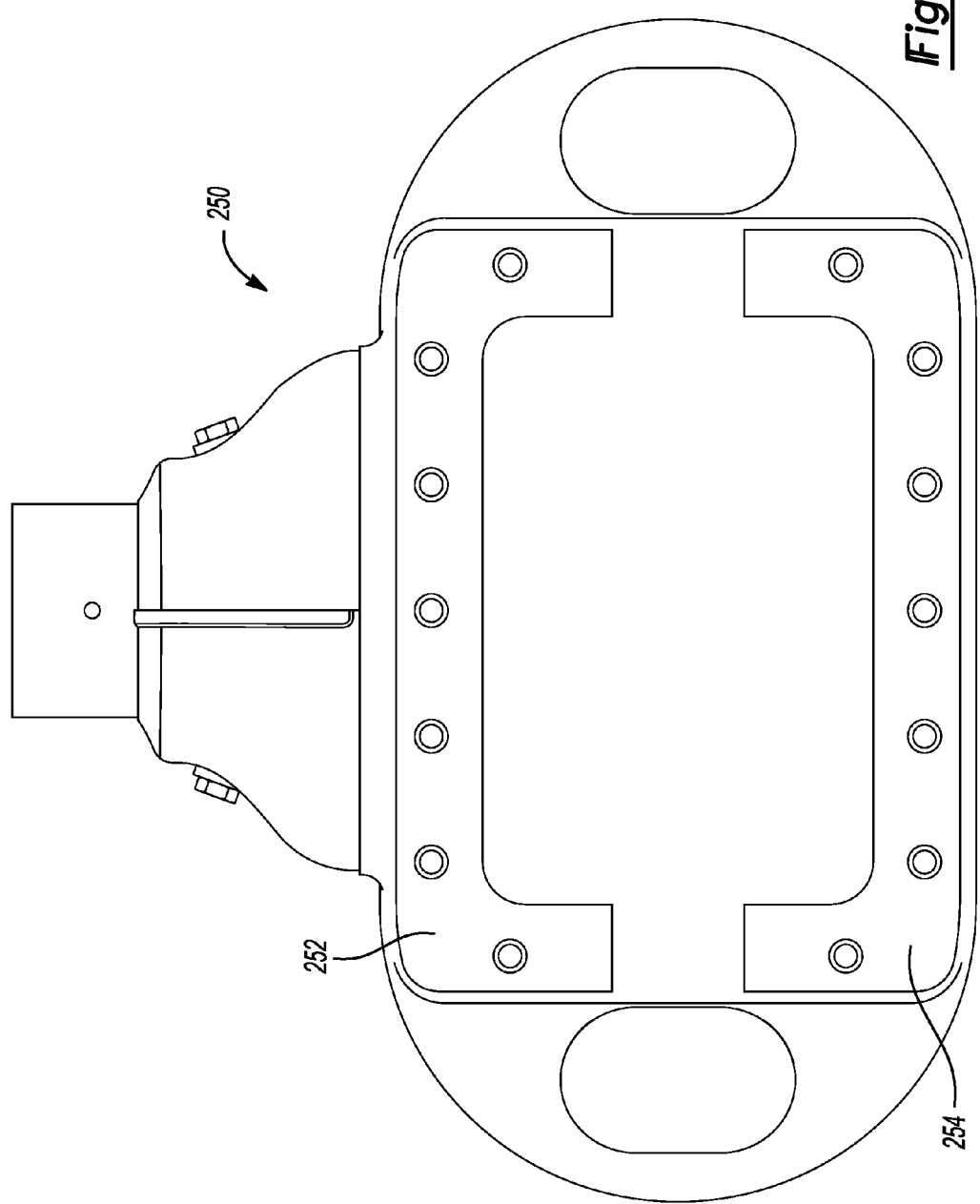
FIG. 8 is a partial end view of another alternate exhaust treatment device.

Another alternate exhaust treatment device is identified at reference numeral 250 and depicted in FIG. 8. Exhaust treatment device 250 is substantially similar to each of the embodiments previously described with at least one exception that the cross-sectional shape of the device is not necessarily a circle or some other regular polygon. Exhaust treatment device 250 also includes a first mounting member 252 spaced apart from a second mounting member 254 in lieu of the one-piece mounting member previously described. It should be appreciated that any number of spaced apart mounting members may be incorporated without departing from the scope of the present disclosure. The individual mounting members are contemplated as being coupled to the exhaust treatment device as previously described. For example, first mounting member 252 and second mounting member 254 may be positioned within an end cap not depicted in FIG. 8. The mounting members 252, 254 may be subsequently trapped between a retaining plate and the end cap. It is also within the scope of the present disclosure to use multiple spaced apart mounting members in the exhaust treatment devices subsequently introduced in this document.

Figure 9:
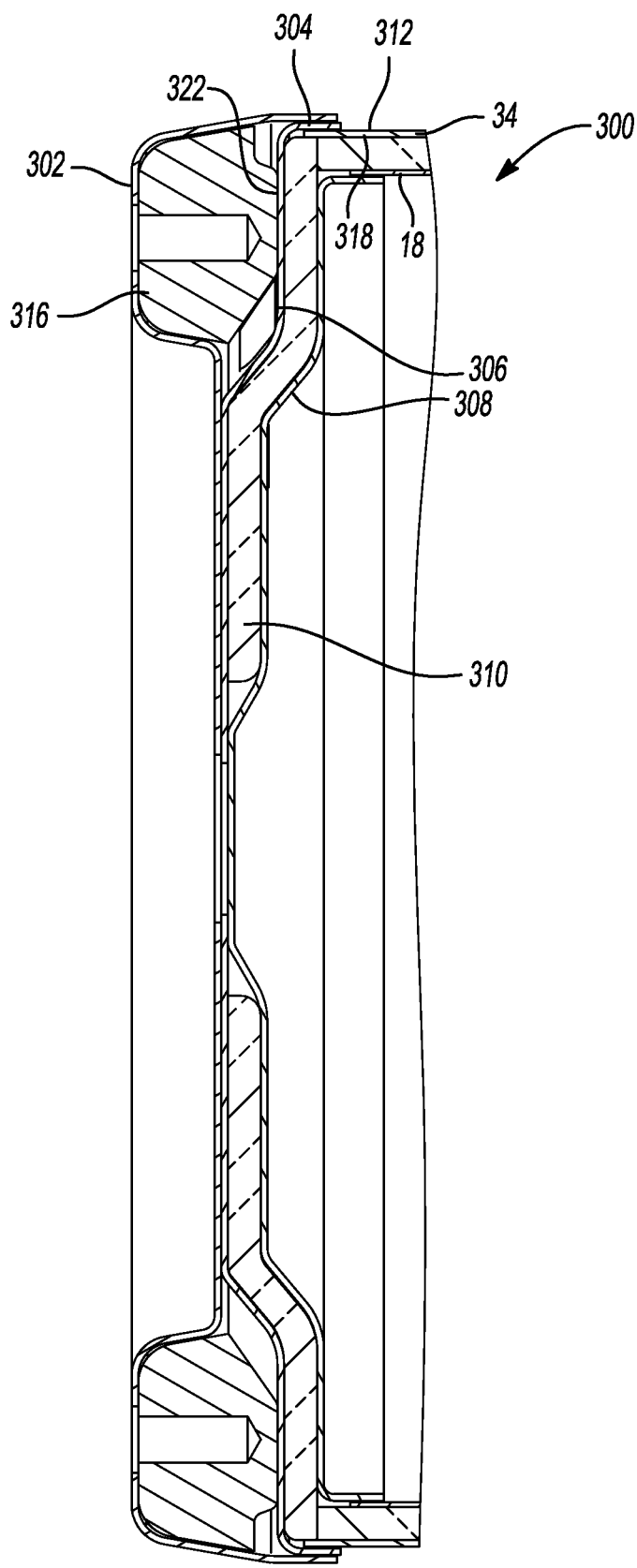
FIG. 9 is a fragmentary cross-sectional of another exhaust treatment device.

FIG. 9 depicts a portion of another alternate exhaust treatment device identified at reference numeral 300. Exhaust treatment device 300 is substantially similar to the exhaust treatment devices previously described with at least one exception that an end cap 302 and a mounting member 316 may be fixed to a previously assembled exhaust treatment device. End cap 302 may be fixed directly to a flange 304 of an outer end plate 306 instead of being directly coupled to outer tube 34. An inner end plate 308 may be fixed to inner tube 18. Inner end plate 308 may be shaped as shown in FIG. 9 or may be elongated and conically shaped as previously described and identified as an inner inlet or an inner outlet. An insulation material 310 is positioned between inner end plate 308 and outer end plate 306. In the arrangement shown in FIG. 9, flange 304 of outer end plate 306 is fixed to an outer surface 312 of outer tube 34. A portion of end cap 302 overlaps flange 304 and is fixed thereto.

Mounting member 316 is trapped between end cap 302 and outer end plate 306. It should be appreciated that in another configuration not shown in FIG. 9, flange 304 may engage an inner surface 318 of outer tube 34 while end cap 302 directly engages outer surface 312 of outer tube 34.

By arranging the components as depicted in FIG. 9, a simplified method of manufacture may result. More particularly, insulation 310 may be accurately compressed a desired amount by engaging outer end plate 306 with inner end plate 308 prior to fixing flange 304 to outer tube 34. The assembly exhaust treatment device 300 may be substantially complete before handling and coupling mounting member 316 to device 300.

Once inner end plate 308 and outer end plate 306 have been fixed to inner tube 18 and outer tube 34, mounting member 316 is positioned within a pocket formed in end cap 302. End cap 302 is positioned to overlap flange 304 and engage outer end plate 306 at or near its center. At this location, each of the three stamped metal components, end cap 302, outer end plate 306 and inner end plate 308 may be simultaneously welded together. Mounting member 316 may engage an outer surface 322 of outer end plate 306. An outer perimeter of end cap 302 may also be welded to flange 304.

FIG. 10 shows another alternate exhaust treatment device identified by reference numeral 350. Only a portion of the exhaust treatment device is shown in FIG. 10 to illustrate the differences from the previously described devices. Exhaust treatment device 350 includes an inner shell 352 including an inner tube 354 and an inner end plate 356. An outer shell 360 includes an outer tube 362 surrounding inner tube 354 and an outer end plate 364. An insulation 366 is positioned between inner tube 354 and outer tube 362, as well as between inner end plate 356 and outer end plate 364.

A mounting member 368 is positioned between inner end plate 356 and outer end plate 364. In one arrangement, a pocket 370 is formed in outer end plate 364 for receipt of mounting member 368. As previously described, mounting member 368 may be constructed as a one-piece monolithic member or, alternatively, may include more than one spaced apart mounting member. In the configuration depicted in FIG. 10, an inner surface 374 of mounting member 368 is positioned in engagement with an outer surface 380 of insulation 366. It should be appreciated that insulation 366 is compressible and a biasing load made be applied on mounting member 368 based on the position of outer end plate 364 and mounting member 368 prior to fixing outer end plate 364 to outer tube 362. A stud 384 is fixed to mounting member 368 and extends through an aperture 386 of outer end plate 364. Stud 384 includes an external thread useful for mounting exhaust treatment device 350 to a support structure. Externally threaded stud 384 is merely an example of a mounting provision that can be provided by mounting member 368. It is also contemplated that mounting member 368 may include an internally extending blind threaded bore. Other mounting provisions including differently shaped fasteners are contemplated as being within the scope of the present disclosure. These fasteners may extend outwardly beyond an outer surface of outer end plate 364 or may be internally located within mounting member 368 and accessible via aperture 386. The alternate mounting provisions may be part of any of the mounting members or mounting rings described in this paper.

FIGS. 11 and 12 depict an exhaust treatment device 400 equipped with an alternate or supplementary mount 402. Mount 402 includes a mounting member 404 positioned in contact with an outer surface 406 of outer tube 34. A retaining plate 410 includes an inner surface 412 shaped as a pocket complementing an outer profile of mounting member 404. Retaining plate 410 is fixed to outer tube 34 at flanges 416, 418. Mounting member 404 or retaining plate 410 need only extend along a portion of the circumference of outer tube 34 as depicted in FIG. 12. To save cost and weight, mounting member 404 and retaining plate 410 circumferentially extend less than 180 degrees. An aperture 422 extends through retaining plate 410 to allow access to a threaded blind bore 424. Alternatively, a stud or other fastener may be fixed to mounting member 404 and extend through aperture 422.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. For example, the mounting member and retaining plate interactions previously described could be utilized on an exhaust treatment device having a single wall in lieu of the inner and outer shell construction previously described. Other features may also be varied in many ways. Such variations are not to be regarded as a departure from the disclosure, and all such modifications are intended to be included within the scope of the disclosure.

What is claimed is:

1. An exhaust treatment device, comprising:
    a housing including an inner shell and an outer shell encapsulating the inner shell;
    an inlet pipe extending through both the outer shell and the inner shell;
    an outlet pipe extending through both the inner shell and the outer shell, wherein an exhaust gas enters the exhaust treatment device through the inlet pipe and exits through the outlet pipe;
    first and second substrates for treating the exhaust gas flowing through the exhaust treatment device, the first and second substrates being coaxially aligned with one another and positioned within the inner shell;
    a first insulating mat circumferentially surrounding the first substrate;
    a second insulating mat circumferentially surrounding the second substrate, wherein the inner shell includes a first inner cap coupled to a first end of an inner tube and a second inner cap fixed to a second end of the inner tube, wherein the inner tube includes a first reduced diameter portion engaging the first insulating mat and compressing the first insulating mat between an inner surface of the first reduced diameter portion and an outer surface of the first substrate, wherein the inner tube includes a second reduced diameter portion spaced apart from the first reduced diameter portion and compressing the second insulating mat between an inner surface of the second reduced diameter portion and an outer surface of the second substrate, the first and second reduced diameter portions being positioned inwardly from the first and second ends of the inner tube, the inner tube also including an undeformed central portion between the first and second reduced diameter portions; and
    insulating material positioned between the inner and the outer shell.

2. The exhaust treatment device of claim 1, wherein the insulation extends between the inner and outer shells from the inlet pipe to the outlet pipe.

3. The exhaust treatment device of claim 2, wherein a gap exists between the first and second substrates and the undeformed central portion of the inner tube concentrically surrounds the gap.

* * * * *